United States Patent [19]

Giammarco et al.

[11] 4,434,144
[45] Feb. 28, 1984

[54] ABSORPTION OF $CO_2$ AND/OR $H_2S$ UTILIZING SOLUTIONS CONTAINING TWO DIFFERENT ACTIVATORS

[76] Inventors: Giuseppe Giammarco; Paolo Giammarco, both of San Marco 3242, Palazzo Morolin, Venezia, Italy

[21] Appl. No.: 310,256

[22] Filed: Oct. 9, 1981

Related U.S. Application Data

[63] Continuation of Ser. No. 91,920, Nov. 7, 1981, abandoned.

[30] Foreign Application Priority Data

Nov. 16, 1978 [IT] Italy ........................... 69613 A/78

[51] Int. Cl.³ ..................... B01D 53/34; B01D 53/36
[52] U.S. Cl. ................................ 423/223; 423/226; 423/229; 423/232
[58] Field of Search ............. 423/223, 226, 228, 229, 423/232, 233

[56] References Cited

U.S. PATENT DOCUMENTS 3,144,301  8/1964  Mayland ........................ 423/229
3,848,057  11/1974 Leder et al. .................... 423/223
3,856,921  12/1974 Shrier et al. .................... 423/228
3,864,449  2/1975  Homberg et al. ............... 423/228
4,094,957  6/1978  Sartori et al. .................. 423/223

FOREIGN PATENT DOCUMENTS 83967   4/1970  German Democratic Rep. ............................ 423/229
788404  1/1958  United Kingdom ............. 423/229

*Primary Examiner*—Earl C. Thomas
*Attorney, Agent, or Firm*—Sughrue, Mion, Zinn, Macpeak & Seas

[57] ABSTRACT

The removal of $CO_2$ and mixtures thereof with $H_2S$ from gaseous mixture containing same, is carried out by using an absorbing solution which comprises a first activating substance chosen from aminoacids and primary and secondary ethanolamines, which effects the initial absorption of $CO_2$ with formation of a carbamate, a second activating substance chosen from $As_2O_3$ and its derivatives, secondary ethanolamines and ammonia, which promotes the hydrolysis and decomposition of the carbamate as the latter forms, and a third substance of a basic nature, which effects the quantitative absorption of $CO_2$ or $CO_2 + H_2S$.

11 Claims, No Drawings

ABSORPTION OF $CO_2$ AND/OR $H_2S$ UTILIZING SOLUTIONS CONTAINING TWO DIFFERENT ACTIVATORS

This is a continuation of application Ser. No. 91,920, filed Nov. 7, 1981, and now abandoned.

BACKGROUND OF THE INVENTION

1. Field of the Invention

The present invention relates to a new and more efficient absorption solution for removing acidic impurities, such as $CO_2$ and/or $H_2S$, from gaseous mixtures containing them.

2. Description of the Prior Art

As is known, the removal of the said impurities is effected by an absorbing solution is a so-called absorption stage; the exhausted solution is then renewed, with expulsion of the impurities previously absorbed, in a so-called regeneration stage.

In the hitherto known art, the said absorbing solutions have been chosen from solutions containing an alkali metal carbonate or an alkali metal phenate, borate or phosphate, or alkali metal salts of aminoacids, and from solutions of ethanolamines, mainly MEA, DEA and TEA, which are also much used.

These solutions contain essentially a substance of a basic nature which effects the quantitative absorption of $CO_2$. It is known that when this basic substance is an alkali metal carbonate, the rate of absorption is very low and the solution is difficult to use in practice in industry. This drawback has been overcome by the addition to the absorption solution, of activating substances such as those listed below, which increase the initial rate of absorption of the $CO_2$, which is then chemically linked to the alkali metal carbonate, thus improving the the overall absorbing power of the solution.

It should be recalled in this connection that it was at first proposed to use potash solutions activated with aminoacids (glycine), patented in 1954, and subsequently to use as activating substances $As_2O_3$ and compounds of selenium and tellurium, these uses also being patented in 1954. Subsequently there was proposed the addition of ethanolamines (the use of which had been suggested as long ago as 1936 in "Carbon Dioxide" by Quinn and Jones), and particularly DEA, the use of which was patented in 1964 and 1965, and lastly the use of the borate of ethanolamine was suggested and subsequently patented.

Here it will be noted briefly that the aforesaid activating substances are divided into two categories: $As_2O_3$ has a catalytic effect on the reaction of $CO_2$ with water, in the sense that the reaction (called the hydration of $CO_2$) is greatly promoted. On the contrary the substances with amino groups (such as the aminoacids and ethanolamines) have a $CO_2$-carrying property, in the sense that they absorb the $CO_2$ with a very high reaction rate, thus facilitating the passage of the $CO_2$ into the liquid phase.

SUMMARY OF THE INVENTION

The object of the present invention is to form a new and more efficient type of solution, having a greater absorbing power than those known until now, and characterized in that it contains at least two activating substances, which exert a dual activating effect on the solution.

The present invention is the result of studies and research carried out to complete and in continuation of the studies and research which has resulted, in their time, in the discovery of the most important activating substances used at present in industry. Basically it has been ascertained that the activating action of the substances with amino groups (aminoacids, ethanolamines and also ammonia) is not only due to the fact that they absorb the $CO_2$ with great speed, thus favouring the passage of the latter from the gaseous phase into the liquid phase and vice versa as is generally held in the literature of the art, but, on the contrary, depends in a fundamental manner on the rate with which the carbamate (which forms by reaction of $CO_2$ with the said amino compounds) is decomposed and hydrolized, reforming the starting amine which is thus again available for use in the rapid absorption of the $CO_2$.

Indeed, it suffices to consider the fact that the activating substance (amino compound) is present in the solution only in small quantities, and is thus rapidly consumed by the reaction and becomes ineffective in a short period of time. It is therefore necessary for the carbamate to decompose and be hydrolised so as to make again available the starting amine, thus prolonging the period of its activating action.

On the basis of the aforesaid considerations, an object of the present invention was that of increasing the rate of decomposition and hydrolysis of the said carbamate of the amine. This object has been achieved by adding to the absorbing solution other particular activating substances which favour the hydrolysis, whereby the absorbing solution is doubly activated in that it contains:

(a) a first activating substance which, as a result, is present in relatively modest amounts, chosen from compounds containing amino groups and having the property of absorbing $CO_2$ at a very high rate with formation of a carbamate, thus facilitating the passage of the $CO_2$ from the gaseous phase into the liquid phase and vice versa. Amino acids and primary and secondary ethanolamines are preferred for the purpose. The rate of absorption by this activating substance must clearly be greater than that of the other components of the solution.

(b) A second and different activating substance which has, among others, the property of favouring the decomposition and the hydrolysis of the said carbamate as it forms, liberating the first activating substance (that is the original amino compound), so as to allow it to be re-used for the rapid absorption of the $CO_2$. $As_2O_3$ and its derivatives, the secondary ethanolamines and $NH_3$ are preferred for the purpose.

(c) A third, basic substance which substantially effects the quantitative absorption of the $CO_2$ introduced by the activating substances mentioned above in (a) and (b).

DETAILED DESCRIPTION OF THE INVENTION

The choice of the above substances (a), (b), (c), and particularly of the activating substances used in the present invention, should be carried out as follows:

(1) The first activating substance which has the function of introducing the $CO_2$ quickly into the liquid phase from the gaseous phase, must have, as mentioned above, a high rate of absorption. It is preferable to use for this purpose aminoacids and mono- or diethanolamines, which have the highest molecular reaction rate constants, as shown by the following values:

| | | |
|---|---|---|
| glycine | 6000 | l/g.mole.sec. |
| MEA | 5100 | l/g.mole.sec. |
| DEA | 1100 | l/g.mole.sec. |
| TEA | 800 | l/g.mole.sec. |
| ammonia | 305 | l/g.mole.sec. |

The rate of absorption also depends, as is known, on the molecular concentration of the compound with an amino group in the solution. In practice, however, the activating substance should not have a molecular concentration greater than that at which the said substance becomes corrosive towards the ferrous material forming the commercial apparatus; it is also necessary to take account of the thermal stability of the substancen as well as its volatility and especially its molecular weight.

It has been found experimentally that glycine is the most convenient of the substances having amino groups, as regards the requirements mentioned above, because of its greater constant of molecular rate of reaction, because it is absolutely free from volatility, because its molecular weight is only 75 g/mole compared with 105 for DEA and 149 for TEA, and, moreover, because its decomposition products are not corrosive, unlike those of ethanolamine, the use of higher temperatures in the thermal conversion apparatus is possible.

However, it may also be possible to use with advantage primary and secondary ethanolamines, and especially diethanolamine because of its low volatility.

Finally, triethanolamine and ammonia may also be present in the absorbing solution for reasons which will be specified in the following.

(2) The second activating substance has, according to the present invention, the task of enhancing the hydrolysis of the carbamate of the amine for the reasons specified above.

It has been ascertained that the reaction mechanism is as follows: $CO_2$ requires two molecules of amine to be absorbed and taken into the liquid phase; the carbamate which originates from this reaction subsequently decomposes, liberating the initial amine, by reacting with one mole of $H_2O$ and liberating $CO_2$ which is given up to and fixed by other components of the solution.

The rate of decomposition of the carbamate depends essentially on the rate with which $CO_2$ is liberated and given up to the said other components of the solution. This occurs essentially through the following two reactions:

$$CO_2 + H_2O = HCO_3^- + H^+ \qquad (1)$$

$$CO_2 + OH^- = HCO_3^- \qquad (2)$$

The rate of the first reaction is very low, but, as is known, it is increased considerably (about 6 to 30 times according to the circumstances) by the catalytic action of $As_2O_3$, suitably added, whereby the rate of decomposition and hydrolysis of the carbamate is greatly increased.

The increase in the rate of decomposition of the carbamate caused by the presence of various amounts of $As_2O_3$ has been experimentally ascertained and measured.

For this purpose the absorbing power of solutions of an alkali metal carbonate activated by the addition of arsenic oxide, or by the addition of glycine, was measured. Similar measurements were carried out with solutions activated by the addition of glycine and arsenic oxide, or by the addition of diethanolamine and arsenic oxide. The absorbing power was measured on the basis of the quantity of $CO_2$ absorbed by the solution, operating in the same apparatus and under the same conditions.

The results, which are summarized in the following table, are of exceptional importance. In fact, it is found that a standard solution containing 50 g/l of glycine, further activated by the addition of 10 g/l of $As_2O_3$, has an absorbing power greater than that of a solution containing 100 g/l of glycine. Moreover, a solution containing 30 g/l of glycine, further activated by the addition of only 5 g/l of $As_2O_3$, has an absorbing power greater than that of the standard 50 g/l glycine solution.

| Solution | | | | Absorbing |
|---|---|---|---|---|
| $K_2O$(g/l) | glycine(g/l) | DEA(g/l) | $As_2O_3$(g/l) | power |
| 250 | 30 | — | — | 31.6% |
| 250 | 30 | — | 5 | 38.7% |
| 250 | 30 | — | 10 | 43.0% |
| 250 | 50 | — | — | 36.8% |
| 250 | 50 | — | 10 | 46.0% |
| 250 | 50 | — | 25 | 46.7% |
| 250 | 60 | — | — | 38.5% |
| 250 | 100 | — | — | 43.5% |
| 250 | 100 | — | 10 | 44.0% |
| 250 | — | 30 | — | 29.6% |
| 250 | — | 30 | 10 | 41.0% |
| 250 | — | — | 10 | 35.7% |
| 250 | — | — | 20 | 40.0% |
| 250 | — | — | 25 | 41.0% |
| 250 | — | — | 50 | 49.0% |
| 250 | — | — | 100 | 57.0% |
| 250 | — | — | 140 | 57.0% |

The results relating to the solutions activated by addition of glycine and arsenic oxide may also be due to the direct activating effect of $As_2O_3$ on the potassium carbonate present in the solution, but it should be noted that the activating effect of the solution containing both glycine and $As_2O_3$ is higher than the sum of the effects due to each individual activator. This shows that an improvement is achieved due to the catalytic action of $As_2O_3$ on the hydrolysis of the glycine carbamate. Thus, for example, a solution containing 30 g/l of glycine and 10 g/l of $As_2O_3$ has an absorbing power of 43.0%. This solution may be considered as a mixture of one half of solution containing 250 g/l of $K_2O$ and 60 g/l of glycine (absorbing power: 38.5%) and one half of solution containing 250 g/l of $K_2O$ and 20 g/l of $As_2O_3$ (absorbing power: 40.0%). This solution should have an average absorbing power of $(40+38.5)/2=39.25\%$, whereas the actual solution has an absorbing power of 43.0%, which is clearly higher.

(3) The other reaction in which the $CO_2$ resulting from the decomposition of the carbamate is given up to the other components of the absorbing solution, thus facilitating the decomposition of the carbamate, is reaction (2) shown above. The viscosity of this reaction essentially depends on the concentration of the (OH) ions.

It is known that solutions of potassium carbonate have an (OH) ion concentration which depends on the degree of carbonation and the temperature of the solution itself. This concentration, even though it is well known to be small, is still sufficient to activate the decomposition of the carbamate in the solutions currently used in industry.

In order to activate the decomposition of the carbamate, use is made according to the present invention, of substances of a basic character (and hence of (OH) ion concentrations greater than those of alkali metal carbonate solutions), having, however, an absorption rate less than that of the first activating substance. For this purpose, there may be used with advantage solutions of triethanolamine, a tertiary amine which acts simply as a base and forms a bicarbonate.

It may also be convenient to use diethanolamine as the second activating substance, especially when the first activating substance is an aminoacid (glycine). For this purpose studies and experiments have been carried out to clarify the effect of the diethanolamine as the second activating substance.

A solution containing 50 g/l of glycine and 250 g/l of $K_2O$ was treated with a current of pure $CO_2$. This resulted in an increase in the degree of carbonation which was measured in the time to ascertain the quantity of $CO_2$ absorbed and hence the absorbing power of the solution. For comparison, a second solution containing 15 g/l of DEA, 25 g/l of glycine and 250 g/l of $K_2O$ was treated by using the same method and apparatus. The results from this comparison were:

after treatment for 15 seconds, the first solution (glycine) had a 33.5% degree of carbonation against 36.5% for the second solution (glycine+DEA);

after 30 seconds, the first solution had a 44.5% degree of carbonation, against 55.6% for the second solution;

after 45 seconds, the first solution had a 55% degree of carbonation, against 59% for the second solution.

This clearly shows the greater absorbing power of the solution doubly activated with glycine and diethanolamine, notwithstanding the fact that the total quantity of the two activators in this solution was purposely kept below that of the glycine in the first solution for greater security of the comparison (see Example 1, below).

(4) According to the present invention, account is also taken of the fact that, in the industrial absorption of $CO_2$, substances having a weakly acidic character, such as boric acid or carbolic acid, and, in general all acids having a dissociation constant of the order of $10^{-10}$, have a considerable influence due to the fact that the presence of a weak acid improves the desorption of $CO_2$; this also results in a reduction in the heat needed for the regeneration and also causes a variation in the degree of final regeneration of the solutions. These influences may be made clear to those skilled in the art through knowledge of the behaviour of arsenical solutions (alkali metal carbonate activated with $As_2O_3$), given that the arsenious acid is also a weak acid having a dissociation constant of $6 \times 10^{-10}$.

Hence, according to the present invention, it is particularly recommended to use solutions to which is added an amino compound of an acid nature, for example glycine, salified by the addition of an amino compound of a basic nature, for example diethanolamine, thus forming diethanolamine glycinate, which, from the example given above, shows a high absorption efficiency.

It is thus also advantageous to use an activating substance of acid character, formed from $As_2O_3$, together with another activating substance of a basic nature, such as triethanolamine and even diethanolamine, thus forming the arsenite of triethanolamine or diethanolamine, which is noticeably more efficient than potassium arsenite.

Obviously, glycine and DEA, as well as $As_2O_3$ and TEA or DEA, may, however, be present in ratios different from the stoichiometric ratios.

It should be noted in this connection that in the current art, with particular reference to U.S. Pat. No. 3,851,041 (A. G. Eickmeyer), it is a common practice to use as activator diethanolamine borate, as the latter should have an absorbing power greater than that of ethanolamine alone. According to the present invention, use is made, in lieu of said diethylamine borate, of diethanolamine glycinate or arsenite, with the advantage that these last products have a higher absorbing power, because the acid compound (boric acid) is replaced by glycine or $As_2O_3$, which are similarly of an acid nature, but are also activators, unlike boric acid.

(5) According to the present invention, as has been stated above, the solution also contains as an essential ingredient, a third substance of a basic nature which effects the quantitative absorption or desorption of the $CO_2$.

The said third substance is that which receives and fixes, generally in the form of a bicarbonate, the $CO_2$ taken into the liquid phase by means of the rapid absorption reactions effected by the activating substances mentioned above.

Preferably this third substance consists of an alkali metal carbonate, which is particularly suitable, especially with regard to the regeneration of the solution by desorption of the $CO_2$. In fact the $CO_2$ is combined with the alkali metal carbonate by particularly weak chemical bonds (in fact the heat of reaction is only 280 $Kcal/Nm^3$ $CO_2$) whereby the expulsion of the $CO_2$ is effected very easily, with simultaneous increase in the concentration of the (OH) ions in the solution. This results in easier decomposition of the carbamate, whereby the $CO_2$ contained therein is also more easily expelled.

However at times, in the present invention, it is convenient to use as the third substance, chemical compounds having stronger basic characteristics than the alkali metal carbonates, such as, for example, triethanolamine, which, as previously indicated, does not have an amino group, but acts as a base and absorbs the $CO_2$ by forming a bicarbonate. The use of triethanol amine is preferable to that of the alkali metal carbonates as regards the rate of absorption, but the heat necessary to operate the purifying cycle is increased due to the fact that the heat of the reaction is increased as indicated in the following table:

Heat of reaction of $CO_2$ with MEA: 910 $Kcal/Nm^3$ $CO_2$

Heat of reaction of $CO_2$ with DEA: 720 $Kcal/Nm^3$ $CO_2$

Heat of reaction of $CO_2$ with TEA: 693 $Kcal/Nm^3$ $CO_2$

Heat of reaction of $CO_2$ with alkali metal carbonate: 280 $Kcal/Nm^3$ $CO_2$

In special circumstances however, that is when the absorption is carried out at temperature close to ambient temperatures or at least upon cooling, or even when the simultaneous absorption of considerable quantities of $H_2S$ is required, it may be convenient to use triethanolamine and even diethanolamine as the third substance of the absorbing solution. Nevertheless, based on the considerations given above, this third substance should have basic properties lower than, or equal to, those of the other active substances present in the solution.

(6) The present invention relates to other matters of considerable industrial importance as well as to those mentioned above.

In the first place it will be noted that the $As_2O_3$ added to the absorbing solution in addition to the activating action previously specified, also exerts an inhibiting action against corrosion of the metallic parts of the plant. To achieve the inhibition needed in industrial practice it suffices according to the present invention for the $As_2O_3$ concentration in the solution to vary within the range of from 2 to 12 g/l. This advantage is very important since the inhibition by arsenic, already practiced for many years, is a completely safe method.

It will also be noted that the $As_2O_3$ inhibits the corrosion of the metallic surfaces of the apparatus by removing existing rust or other iron oxides, which, for the most part, are dissolved in the solution, while the inhibition is achieved by means of a protective ferro-arsenical film.

It has been shown that the aforesaid iron compounds, particularly ferric compounds, resulting from existing rust or even from other sources, form with the arsenic a soluble ferro-arsenical complex which may reach concentrations of from 1 to 2 g/l, or even noticeably greater concentrations. Practical experience has shown that, in particular circumstances, the iron dissolved in the solution as aforesaid, may precipitate in the form of very bulky ferro-arsenical sludges which form obstructions and considerably disrupt the correct operation of the plant. This disadvantage can be eliminated by adding glycine in an amount equal to or greater than 10 g/l to the arsenical solution.

Hence glycine, as well as having an activating action on the absorption of $CO_2$, also destroys the soluble ferro-arsenical complex mentioned above, thereby avoiding the precipitation of the ferro-arsenical sludges, and the iron is precipitated instead in the form of a powder, probably because glycine forms chelates with iron.

(7) According to the present invention, as mentioned above, ammonia may advantageously be added to the solution as a second activating substance.

The ammonia also acts as an amine and absorbs the $CO_2$ with formation of the carbamate, although its low molecular reaction-rate constant (only 305 l/g mole sec.) and its high volatility render it difficult to use satisfactorily in industry as the activating substance, notwithstanding its low molecular weight.

Nevertheless this may conveniently be used as an activating substance in addition to the other substances (such as glycine, ethanolamine, $As_2O_3$ and the like) used for the purpose according to the invention.

To this end suitable embodiments have been studied, which are particularly recommended when the plant for the elimination of $CO_2$ is connected to a plant for the production of ammonia.

The ammonia is added to the absorbing solution in the upper zone of the absorption column, and preferably at an intermediate height of this zone. In this zone, the absorption has only for object the removal of the small residual quantities of $CO_2$ from the gaseous mixture to be purified; moreover, especially in the case of two-stage installations and those with split flows, small quantities of solution are used in this zone. Consequently the quantity of ammonia to be added to the solution is relatively modest.

The ammonia thus added to the solution exert therein its activating action and directly participates in the absorption of the $CO_2$.

Part of the ammonia, because of its volatility, leaves the absorption column at the top, together with the purified gaseous mixture, and is conveyed with this latter to the $NH_3$ synthesis plant where it is recovered. It should be noted that in modern technics, $CO_2$ and CO are converted into methane by reaction with $H_2$ on suitable catalysts (methanators), so that the simultaneous presence of $CO_2$ and $NH_3$ with possible drawbacks deriving from the formation of solid carbamate deposits, is fully avoided after this methanation. A further part of the ammonia is circulated downwardly with the solution in the form of ammonium carbonate and carbamate formed by the absorption of the $CO_2$. One portion of the said carbamate and carbonate decomposes in the lower part of the absorption apparatus, yielding $CO_2$ to the other components of the absorbing of solution, whereas a part of the ammonia is used again for the absorption of further ammonia of $CO_2$, while the remaining part is carried off upwardly by the gaseous flow.

As a result, the solution discharged from the bottom of the absorbing column contains ammonia in the form of a carbamate and a carbonate. The solution is delivered to the regeneration column, where the ammonium carbamate and carbonate are decomposed; the ammonia resulting from this decomposition is practically completely recovered in the aqueous condensate of the $CO_2$-condensers placed at the outlet from the regeneration column.

It has in fact been found, with reference to the point mentioned above, that the $CO_2$ leaving the said condensers and discharged externally, or conveyed to urea-type conversion apparatus, contains only small traces (3 to 5 ppm) of ammonia, due to the fact that the said ammonia is present in the condensate in the form of ammonium bicarbonate, practically free from $NH_3$ vapour pressure. According to the invention, said condensate of the $CO_2$-condensers is distilled, yielding ammonia free from $CO_2$ which is recycled to the top of the absorption column, as indicated above. On the basis of the preceding considerations, it is preferable to arrange the coolers for the $CO_2$ issuing from the regeneration column so that the ammonia be collected only in the first part of the condensate, which is then distilled to recover the ammonia, at lower cost.

When the $CO_2$-removing plant is connected to a reforming plant, as is known in the art, the aqueous condensate from the $CO_2$-condensers may be conveyed to the reforming plant as an alternative to the embodiment mentioned above, and may be treated there so as to extract the ammonia by the method discloses in British Patent Application Publication No. 2001336A According to this method the ammonia extracted is conveyed, together with methane, or gasified liquid hydrocarbons, or with air, to the primary or secondary reforming step and then to the CO conversion step; the larger part of the ammonia decomposes into $H_2$ and $N_2$ which are re-used, in the cycle, to reform $NH_3$. This is, as in the preceding cases, a characteristic of the present method, and also of the methods described below, namely the fact that a circulation of ammonia is thus established between the $CO_2$ removal plant and the $NH_3$ synthesis plant, which is particularly interesting because it resolves the well-known disadvantage of loss of ammonia due to its volatility and allows the concentration of ammonia in the absorbing solution to be increased considerably so that the gaseous mixture may be purified even down to a few ppm of $CO_2$.

It is observed moreover, that the ammonia is added, in the above embodiment, to the solution in the upper zone of the absorption column. In many cases, however, it is more convenient to use a variant of the above method, which consists of treating the regenerated absorbing solution (or part of this), in a suitable column or contact zone, with the purge gas of the $NH_3$-synthesis, which, as is known, contains ammonia, before the solution is fed into the absorption column. During this treatment the purge gases improve the degree of regeneration of the solution by their $CO_2$-desorbing action, while yielding the greater part of their ammonia content. The solution is subsequently extracted from the said column or contact zone and conveyed to the $CO_2$-absorption column where its $NH_3$ is used as described previously. The purge gases, in their turn, after being used as aforesaid, are sent to the reforming oven and used therein as fuel, or are conveyed to other different uses. The absorbing solution (or part of this) may also be circulated between the upper zone of the absorption column and the column or contact zone mentioned above to treat the said solution in the latter with the purge gases of the synthesis.

Lastly, in a further variation, the purified gaseous mixture containing small, residual quantities of $CO_2$ (0.1 to 0.3% $CO_2$) is scrubbed in a suitable column or contact zone with water containing ammonia, which greatly increases the purity of the gaseous mixture, and subsequently is conveyed to the methanation apparatus and to the ammonia synthesis. The ammoniacal water, when it has completed the said washing, is conveyed to an intermediate level of the $CO_2$-absorption column of the plant, where it is mixed with the regenerated solution fed to the column such that its ammonia content is used as an activating substance, as previously described.

EXAMPLE 1

In an industrial plant for the purification of 32,500 $Nm^3/h$ of gas at a pressure of 23 atmospheres, with an initial $CO_2$ content of 31.4%, the $CO_2$ is removed by means of a two-stage apparatus in which a solution containing 250 g/l of $K_2O$, 25 g/l of glycine and 15–20 g/l of $As_2O_3$ is circulated. The solution is found to have an efficiency which, other conditions being left unchanged, is noticeably improved, and the gaseous mixture is purified down to a 200 ppm $CO_2$ content.

Similar results may be obtained with solutions containing 250 g/l $K_2O$, 30 g/l DEA and 15–20 g/l $As_2O_3$.

EXAMPLE 2

In an industrial plant for the purification of 48000 $Nm^3/h$ of gas at a pressure of 20 atmospheres and with an initial $CO_2$ content of 18%, the $CO_2$ was removed by means of a two-stage apparatus, using the two-pressure-level regeneration method described in Italian Patent No. 991,548 of the same applicants.

The solution used contained 250 g/l og $K_2O$, 30 g/l of glycine and 10 g/l of $As_2O_3$. In this case also the results showed an improved absorption efficiency of the solution.

EXAMPLE 3

A solution containing 250 g/l of $K_2O$, 25 g/l of glycine and 15 g/l of DEA was tested in an industrial plant, where it was shown to have an absorption efficiency noticeably greater than that of the standard solution containing 250 g/l $K_2O$ and 50 g/l of glycine, which was used before.

EXAMPLE 4

A potash solution activated with glycine, containing 250 g/l $K_2O$ and 50 g/l of glycine was activated by a further addition of 5 g/l of $NH_3$.

The absorption efficiency of the solution was noticeably better than that of a solution containing 250 g/l of $K_2O$ activated with 140 g/l of $As_2O_3$ which is the most efficient solution known until now.

We claim:

1. A process for removing $CO_2$ and $H_2S$ from a gaseous mixture by means of an absorbing solution, comprising:

circulating said solution between an absorption stage and a regeneration stage at an elevated temperature, said solution containing a prevailing concentration of a basic substance which essentially effects absorption of $CO_2$ and $H_2S$ quantitatively, and an activating substance which absorbs $CO_2$ with greater activity than said basic substance thereby improving absorption efficiency and facilitating $CO_2$ passage from gaseous phase to liquid phase and back, said absorbing solution containing two different activating substances capable of increasing absorption efficiency of said solution in different and complementary ways, said solution comprising:

(a) a first activating substance consisting of glycine which absorbs $CO_2$ with the formation of a carbamate, at a higher rate than other components in said solution, facilitating $CO_2$ passage into liquid phase;

(b) a second activating substance consisting of $As_2O_3$ in an amount of 0.25 moles or less per mole of said first activating substance which essentially enhances decomposition and hydrolysis of said carbamate, thus regenerating said first activating substance (a); and (c) an alkali metal carbonate which essentially effects said quantitative absorption of $CO_2$ introduced by said activating substances (a) and (b).

2. A process for removing $CO_2$ and $H_2S$ from a gaseous mixture by means of an absorbing solution, comprising:

circulating said solution between an absorption stage and a regeneration stage at an elevated temperature, said solution containing a prevailing concentration of a basic substance which essentially effects absorption of $CO_2$ and $H_2S$ quantitatively, and an activating substance which absorbs $CO_2$ with greater activity than said basic substance thereby improving absorption effeciency and facilitating $CO_2$ passage from gaseous phase to liquid phase and back, said absorbing solution containing two different activating substances capable of increasing absorption efficiency of said solution in different and complementary ways, said solution comprising:

(a) a first activating substance consisting of diethanolamine which absorbs $CO_2$ with the formation of a carbamate, at a higher rate than other components in said solution, facilitating $CO_2$ passage through liquid phase;

(b) a second activating substance consisting of $As_2O_3$ in an amount of 0.25 mole or less per mole of said first activating substance which essentially enhances decomposition and hydrolysis of said carbamate, thus regenerating said first activating substance (a); and (c) an alkali metal carbonate which essentially effects said quantitative absorption of $CO_2$ introduced by said activating substances (a) and (b).

3. A process for removing $CO_2$ and $H_2S$ from a gaseous mixture by means of an absorbing solution, comprising:

circulating said solution between an absorption stage and a regeneration stage at an elevated temperature, said solution containing a prevailing concentration of a basic substance which essentially effects absorption of $CO_2$ and $H_2S$ quantitatively, and an activating substance which absorbs $CO_2$ with greater activity than said basic substance thereby improving absorption efficiency and facilitating $CO_2$ passage from gaseous phase to liquid phase and back, said absorbing solution containing two different activating substances capable of increasing absorption efficiency of said solution in different and complementary ways, said solution comprising:

(a) a first activating substance consisting of glycine which absorbs $CO_2$ with the formation of a carbamate, at a higher rate than other components in said solution, facilitating $CO_2$ passage through liquid phase;

(b) a second activating substance consisting of diethanolamine which essentially enhances decomposition and hydrolysis of said carbamate, thus regenerating said first activating substance (a); and (c) an alkali metal carbonate which essentially effects said quantitative absorption of $CO_2$ introduced by said activating substances (a) and (b).

4. A process for removing $CO_2$ and $H_2S$ from a gaseous mixture by means of an absorbing solution, comprising:

circulating said solution between an absorption stage and a regeneration stage at an elevated temperature, said solution containing a prevailing concentration of a basic substance which essentially effects absorption of $CO_2$ and $H_2S$ quantitatively, and an activating substance which absorbs $CO_2$ with greater activity than said basic substance thereby improving absorption efficiency and facilitating $CO_2$ passage from gaseous phase to liquid phase and back, said absorbing solution containing two different activating substances capable of increasing absorption efficiency of said solution in different and complementary ways, said solution comprising:

(a) a first activating substance consisting of monoethanolamine which absorbs $CO_2$ with the formation of a carbamate, at a higher rate than other components in said solution, facilitating $CO_2$ passage through liquid phase;

(b) a second activating substance consisting of $As_2O_3$ in an amount of 0.25 mole or less per mole of said first activating substance which essentially enhances decomposition and hydrolysis of said carbamate, thus regenerating said first activating substance (a); and (c) an alkali metal carbonate which essentially effects said quantitative absorption of $CO_2$ introduced by said activating substances (a) and (b).

5. A process for removing $CO_2$ and $H_2S$ from a gaseous mixture by means of an absorbing solution, comprising:

circulating said solution between an absorptive stage and a regeneration stage at an elevated temperature, said solution containing a prevailing concentration of a basic substance which essentially effects absorption of $CO_2$ and $H_2S$ quantitatively, and an activating substance which absorbs $CO_2$ with greater activity than said basic substance thereby improving absorption efficiency and facilitating $CO_2$ passage from gaseous phase to liquid phase and back, said absorbing solution containing two different activating substances capable of increasing absorption efficiency of said solution in different and complementary ways, said solution comprising:

(a) a first activating substance selected from the group consisting of glycine, diethanolamine, and monoethanolamine, said first activating substance absorbing $CO_2$ with the formation of a carbamate, at a higher rate than other components in said solution, facilitating $CO_2$ passage into liquid phase;

(b) a second activating substance consisting of ammonia which essentially enhances decomposition and hydrolysis of said carbamate, thus regenerating said first activating substance (a); and (c) an alkali metal carbonate which essentially effects said quantitative absorption of $CO_2$ introduced by said activating substances (a) and (b).

6. A process for removing $CO_2$ and $H_2S$ from a gaseous mixture by means of an absorbing solution, comprising:

circulating said solution between an absorption stage and a regeneration stage at an elevated temperature, said solution containing a prevailing concentration of a basic substance which essentially effects absorption of $CO_2$ and $H_2S$ quantitatively, and an activating substance which absorbs $CO_2$ with greater activity than said basic substance thereby improving absorption efficiency and facilitating $CO_2$ passage from gaseous phase to liquid phase and back, said absorbing solution containing two different activating substances capable of increasing absorption efficiency of said solution in different and complementary ways, said solution comprising:

(a) a first activating substance consisting of glycine which absorbs $CO_2$ with the formation of a carbamate, at a higher rate than other components in said solution, facilitating $CO_2$ passage into the liquid phase;

(b) a second activating substance consisting of $As_2O_3$, in an amount of 0.25 mole or less per mole of said first activating substance, said second activating substance absorbing $CO_2$ and essentially enhancing decomposition and hydrolysis of said carbamate, thus regenerating said first activating substance; and (c) triethanolamine which essentially effects said quantitative absorption of $CO_2$ introduced by said activating substances (a) and (b).

7. A process as claimed in any of claims 1, 2, 3, 4 or 5 wherein said basic substance (c) further includes triethanolamine.

8. A process as claimed in any of claims 1, 2, 3, 4 or 6 wherein said second activating substance is further comprised of ammonia.

9. A process as claimed in claim 1 wherein said first activating substance (a) is further comprised of diethanolamine.

10. A process as claimed in any of claims 1, 2, 3, 4, 5 or 6, wherein said solution consists essentially of (a), (b), and (c).

11. A process as claimed in any of claims 1, 2, 3, 4 or 5 wherein said alkali metal carbonate is $K_2CO_3$.

* * * * *